(12) United States Patent
Liu et al.

(10) Patent No.: US 8,880,494 B2
(45) Date of Patent: Nov. 4, 2014

(54) LONGEST PREFIX MATCH SCHEME

(75) Inventors: Jian Liu, Palo Alto, CA (US); Philip Lynn Leichty, Rochester, MN (US); How Tung Lim, San Jose, CA (US); John Michael Terry, San Jose, CA (US); Mahesh Srinivasa Maddury, San Jose, CA (US); Wing Cheung, Fremont, CA (US); Kung Ling Ko, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 13/284,829

(22) Filed: Oct. 28, 2011

(65) Prior Publication Data
US 2013/0031077 A1    Jan. 31, 2013

Related U.S. Application Data

(60) Provisional application No. 61/512,863, filed on Jul. 28, 2011.

(51) Int. Cl.
| | |
|---|---|
| G06F 17/30 | (2006.01) |
| H04L 12/743 | (2013.01) |
| G06F 7/02 | (2006.01) |
| H04L 12/745 | (2013.01) |

(52) U.S. Cl.
CPC .............. *G06F 7/02* (2013.01); *H04L 45/7457* (2013.01); *H04L 45/748* (2013.01)
USPC ........... 707/706; 707/707; 707/741; 707/749; 707/769; 709/238; 709/245; 711/108; 711/159

(58) Field of Classification Search
USPC .......... 707/741, 749, 769, 706–707; 709/238, 709/245; 711/108, 159
See application file for complete search history.

(56) References Cited

U.S. PATENT DOCUMENTS

| | | | | |
|---|---|---|---|---|
| 6,212,183 | B1 * | 4/2001 | Wilford | 370/392 |
| 6,223,172 | B1 * | 4/2001 | Hunter et al. | 707/741 |
| 6,237,061 | B1 * | 5/2001 | Srinivasan et al. | 711/108 |
| 6,308,220 | B1 * | 10/2001 | Mathur | 709/238 |

(Continued)

OTHER PUBLICATIONS

Eatherton, W. et al. "Tree Bitmap: Hardware/Software IP Lookups with Incremental Updates", ACM SIGCOMM Computer Communication Review, 34(2) 97-122, 2004.

(Continued)

*Primary Examiner* — Frantz Coby
(74) *Attorney, Agent, or Firm* — Bever, Hoffman & Harms, LLP (57) ABSTRACT

A LPM search engine includes a plurality of exact match (EXM) engines and a moderately sized TCAM. Each EXM engine uses a prefix bitmap scheme that allows the EXM engine to cover multiple consecutive prefix lengths. Thus, instead of covering one prefix length L per EXM engine, the prefix bitmap scheme enables each EXM engine to cover entries having prefix lengths of L, L+1, L+2 and L+3, for example. As a result, fewer EXM engines are potentially underutilized, which effectively reduces quantization loss. Each EXM engine provides a search result with a determined fixed latency when using the prefix bitmap scheme. The results of multiple EXM engines and the moderately sized TCAM are combined to provide a single search result, representative of the longest prefix match. In one embodiment, the LPM search engine supports 32-bit IPv4 (or 128-bit IPv6) search keys, each having associated 15-bit level 3 VPN identification values.

25 Claims, 6 Drawing Sheets

(56) References Cited

U.S. PATENT DOCUMENTS

| | | | |
|---|---|---|---|
| 6,396,536 B1* | 5/2002 | Howell et al. | 348/180 |
| 6,516,319 B1 | 2/2003 | Benayoun et al. | |
| 6,675,163 B1* | 1/2004 | Bass et al. | 1/1 |
| 6,925,503 B2* | 8/2005 | Davis et al. | 709/238 |
| 7,047,317 B1* | 5/2006 | Huie et al. | 709/245 |
| 7,079,542 B2 | 7/2006 | Park et al. | |
| 7,089,240 B2* | 8/2006 | Basso et al. | 1/1 |
| 7,155,516 B2* | 12/2006 | Musoll et al. | 709/226 |
| 7,219,184 B2 | 5/2007 | Stojancic | |
| 7,299,227 B2* | 11/2007 | Richardson | 1/1 |
| 7,424,468 B2* | 9/2008 | Park et al. | 1/1 |
| 7,433,355 B2* | 10/2008 | Wilson et al. | 370/392 |
| 7,577,670 B2* | 8/2009 | Ho et al. | 1/1 |
| 7,630,367 B2* | 12/2009 | Singh | 370/389 |
| 7,702,630 B2* | 4/2010 | Basso et al. | 707/769 |
| 7,877,481 B2* | 1/2011 | Musoll et al. | 709/226 |
| 7,895,213 B2* | 2/2011 | Richardson | 707/749 |
| 7,940,668 B2 | 5/2011 | Retana et al. | |
| 7,986,696 B1* | 7/2011 | Miliavisky et al. | 370/392 |
| 8,200,686 B2 | 6/2012 | Rhoades | |
| 2003/0163637 A1* | 8/2003 | Villaret et al. | 711/108 |
| 2003/0174717 A1* | 9/2003 | Zabarski et al. | 370/401 |
| 2004/0024757 A1 | 2/2004 | Park et al. | |
| 2004/0139274 A1* | 7/2004 | Hui | 711/108 |
| 2004/0236720 A1* | 11/2004 | Basso et al. | 707/1 |
| 2005/0135135 A1* | 6/2005 | Sharma et al. | 365/49 |
| 2006/0036705 A1* | 2/2006 | Musoll et al. | 709/210 |
| 2006/0173831 A1* | 8/2006 | Basso et al. | 707/3 |
| 2007/0110090 A1* | 5/2007 | Musoll et al. | 370/429 |
| 2007/0192303 A1* | 8/2007 | Stojancic | 707/3 |
| 2008/0181139 A1 | 7/2008 | Rangarajan et al. | |

OTHER PUBLICATIONS

Shannon, Claude. "Communication Theory of Secrecy Systems", 1949, 60 pages.

Haider, Aun, et al. "An Evaluation of IP-Address Lookup Algorithms", First International Conference on Industrial and Information Systems, ICIIS 2006, Aug. 8-11, 2006, Sri Lanka, pp. 571-576.

Kobayashi Masayoshi, et al. "A Longest Prefix Match Search Engine for Multi-Gigabit IP Pocessing", IEEE Conference on Communications, ICC 2000, Jun. 18-22, 2000, New Orleans, LA, USA, pp. 1360-1364.

Tobola, Jiri, et al. "Effective Hash-based IPv6 Longest Prefix Match", IEEE 14th International Symposium on Design and Diagnostics of Electronic Circuits and Systems, DDECS 2011, Apr. 13-15, 2011, 4 pages.

Tzeng, Henry Hong-Yi, et al. "On Fast Address-Lookup Algorithms", IEEE Journal on Selected Areas in Communications, vol. 17, No. 6, Jun. 1999, pp. 1067-1082.

* cited by examiner

LONGEST PREFIX MATCH SCHEME

CROSS-REFERENCE TO RELATED APPLICATION

The present application claims priority to U.S. Provisional Patent Application Ser. No. 61/512,863, filed on Jul. 28, 2011 and entitled "Darter2 LPM Scheme", the contents of which are incorporated herein by reference for all purposes.

FIELD OF THE INVENTION

The present invention relates to a system and method for implementing longest prefix match (LPM) operations.

RELATED ART

There are two main categories of hardware-based longest prefix match search engines, which include (1) ternary content addressable memory (TCAM) and (2) static random access memory/dynamic random access memory (SRAM/DRAM) based algorithmic engines.

By 2013, the largest and fastest TCAM is expected to have a storage capacity of 80 Mb, and operate at a frequency of 500 MHz. Approximately 2-4 of these TCAMs will be required to implement a search engine that includes single LPM database having 1-2 million entries, and is capable of performing up to 600 million searches per second. This TCAM-based solution will be too expensive and power hungry to be practical.

Most algorithmic search schemes are TRIE (prefix tree) based. Algorithmic schemes use SRAM or DRAM instead of TCAM, and enjoy silicon area efficiency. For example, each DRAM cell is implemented by one transistor and one capacitor, and each SRAM cell is implemented by six transistors. In general, the required layout area of an on-chip SRAM cell is about 1.5 to 2 times larger than the required layout area of an on-chip DRAM cell. In contrast, each TCAM cell is implemented by sixteen transistors (six transistor to store data, six transistors to implement a masking function (i.e., to support "don't care" values) and four transistors to implement a comparison function). As a result, the required layout area of an on-chip TCAM cell is typically about 3-4 times larger than the required layout area of an on-chip SRAM cell. In addition, an array of TCAM cells consumes significantly more power than an array of SRAM/DRAM cells having the same capacity, due to the nature of parallel access to all entries of the TCAM array.

Although SRAM/DRAM arrays are smaller and consume less power than TCAM arrays having the same storage capacity, the TRIE based schemes that use SRAM/DRAM arrays are undesirably complex in both hardware design and software management.

It would therefore be desirable to have a LPM search engine that overcomes the above-described deficiencies of TCAM arrays and SRAM/DRAM based algorithmic search engines.

SUMMARY

Accordingly, the present invention provides a LPM search engine that includes a plurality of exact match (EXM) engines and a TCAM of moderate size. Each EXM engine uses a prefix bitmap scheme that allows each EXM engine to cover multiple consecutive prefix lengths. Thus, instead of covering one prefix length L per EXM engine, the prefix bitmap scheme enables each EXM engine to cover entries having prefix lengths of L, L+1, L+2 and L+3, for example. As a result, fewer EXM engines are potentially underutilized, which effectively reduces quantization loss.

Each EXM engine provides a search result with a determined fixed latency when using the prefix bitmap scheme. The results of multiple EXM engines and the moderately sized TCAM are combined to provide a single search result, representative of the longest prefix match. In accordance with one embodiment, the LPM search engine may support 32-bit IPv4 search keys having associated 15-bit level 3 (L3) virtual private network (VPN) identification values. In another embodiment, the LPM search engine may support 32-bit IPv4 search keys or 128-bit IPv6 search keys, each having associated 15-bit level 3 (L3) virtual private network (VPN) identification values.

The present invention will be more fully understood in view of the following description and drawings.

DETAILED DESCRIPTION

In accordance with one embodiment, the present invention provides a LPM search engine that implements a hash based EXM search engine. The hash based EXM search engine is implemented on an ASIC with on-chip DRAM or SRAM (i.e., a RAM-based EXM search engine), and may be augmented with a small TCAM array. As described in more detail below, the hash based EXM search engine of the present invention advantageously has moderate hardware design complexity and moderate software management complexity.

The present invention will initially be described in connection with the use of 47-bit search keys that include a 32-bit IPv4 value and an associated 15-bit level 3 (L3) virtual private network (VPN) identification value. For such an example, there are a total of 33 prefix lengths that need to be considered, including prefix length 0 (match all) to prefix length 32 (last hop, exact match). Notice that the 15-bit VPN value always requires an exact match, which means that as far as the prefix goes, there are only 33 possible prefix lengths. However, adding the VPN value to the search key completely changes the number of entries per prefix length. Because the search key includes the 15-bit VPN value, it is not possible to cover short prefix lengths with a TCAM of moderate size. For instance, a prefix length of 10 (/10) combined with a unique 1K VPN value would have one million combinations, as compared with the 1K combinations provided by the prefix length of /10 alone.

From the perspective of ASIC physical design and area efficiency, it is desirable to have fewer EXM engines having larger sizes. Large EXM engines can efficiently use on-chip DRAM instead of less area efficient on-chip SRAM. Stated another way, with a sufficiently small memory configuration, DRAM has little or no advantage in area efficiency compared to SRAM. In accordance with one embodiment, when using an IBM 32 nm fabrication process, an EXM engine must have a capacity of at least about 64K entries in order to experience the area efficiencies provided by on-chip DRAM. In accordance with a first embodiment, the LPM search engine may include 32 EXM engines, each having a capacity of 64K entries, for a total of 2M EXM entries.

In accordance with one embodiment, each EXM engine implements a prefix bitmap scheme that allows each EXM engine to store entries having more than one prefix length. Thus, instead of storing entries for only a single prefix length, each EXM engine of the present invention may effectively store entries having a plurality of consecutive prefix lengths (i.e., prefix lengths L, L+1, etc.). By allowing each EXM engine to cover multiple prefix lengths using the prefix bitmap scheme, the number of underutilized EXM engines can be reduced, thereby effectively reducing quantization loss within the LPM search engine.

Figure 1:
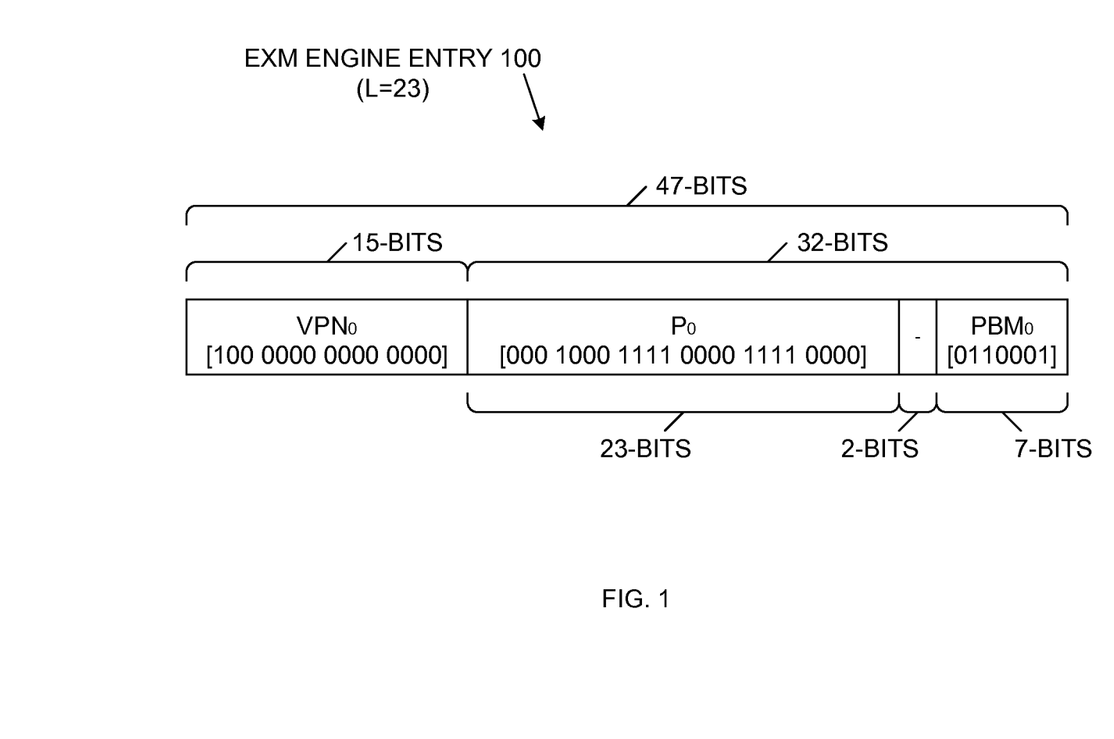
FIG. 1 is a block diagram of an entry of an exact match (EXM) engine in accordance with one embodiment of the present invention.

FIG. 1 is a block diagram of an entry 100 of an EXM engine in accordance with one embodiment of the present invention. In one embodiment, EXM engine entry 100 has a width equal to the longest prefix to be matched. Thus, assuming a VPN value having a length of 15 bits and an IPv4 address having a length of 32 bits, EXM engine entry 100 will have a width of 47 bits. EXM engine entry 100 is capable of storing IPv4 prefix values having lengths of L, L+1 and L+2. Although EXM engine entry 100 stores IPv4 prefixes having three different lengths, it is understood that other numbers of prefix lengths can be stored by EXM engine entry 100 in other embodiments. Some such embodiments are described in more detail below.

In the present example, it is assumed that L=23 bits, such that EXM engine entry 100 is capable of representing IPv4 prefixes having lengths of 23, 24 and 25 bits. As described in more detail below, a 7-bit prefix bitmap value is also included in the EXM engine entry 100 in order to allow this entry to represent prefixes having three different lengths. Thus, EXM engine entry 100 stores a 15-bit VPN id value $VPN_0$, a prefix value $P_0$ that has a length of L (23-bits), and a corresponding prefix bitmap value $PBM_0$ that has a length of 7-bits. Note that two bits of EXM engine entry 100 are unused in the present example. Also note that the prefix bitmap value $PBM_0$ is included in the lowest order bits in the described embodiments, thereby making the prefix bitmap value $PBM_0$ easy to locate within the entry 100.

The manner in which the prefix bitmap value $PBM_0$ enables the storage of prefixes of three different lengths (/23, /24 and /25) will now be described. Table 1 below shows an example of how the 7-bit prefix bitmap value $PBM_0[6:0]$ specifies prefix values having lengths of 23, 24 and 25 bits.

TABLE 1

| Prefix Bitmap | | |
|---|---|---|
| Prefix Bitmap Location | Associated Prefix length | Prefix represented by set Prefix Bitmap bit |
| $PBM_0[0]$ | 23-bits (L) | $VPN_0 + P_0$ |
| $PBM_0[1]$ | 24-bits (L + 1) | $VPN_0 + P_0 + 0$ |
| $PBM_0[2]$ | 24-bits (L + 1) | $VPN_0 + P_0 + 1$ |
| $PBM_0[3]$ | 25-bits (L + 2) | $VPN_0 + P_0 + 00$ |

TABLE 1-continued

| Prefix Bitmap | | |
|---|---|---|
| Prefix Bitmap Location | Associated Prefix length | Prefix represented by set Prefix Bitmap bit |
| $PBM_0[4]$ | 25-bits (L + 2) | $VPN_0 + P_0 + 01$ |
| $PBM_0[5]$ | 25-bits (L + 2) | $VPN_0 + P_0 + 10$ |
| $PBM_0[6]$ | 25-bits (L + 2) | $VPN_0 + P_0 + 11$ |

Table 1 assumes that the EXM engine entry 100 represents one or more values that include both the VPN value $VPN_0$ and the 23-bit prefix value $P_0$. The prefix bitmap location entries $PBM_0[6:0]$ identify the values represented by the EXM engine entry 100 in accordance with Table 1. Thus, if the prefix bitmap location $PBM_0[0]$ is activated (i.e., has a logic '1' state), then EXM engine entry 100 represents a prefix value having a 23-bit prefix length (which is equal to the $VPN_0$ value followed by the 23-bit prefix value $P_0$). If the prefix bitmap location $PBM_0[0]$ is deactivated (logic '0'), the EXM engine entry 100 does not represent a prefix value having a 23-bit prefix length.

If the prefix bitmap location $PBM_0[2]$ is activated (i.e., has a logic '1' state), then EXM engine entry 100 represents a prefix value having a 24-bit prefix length. In accordance with Table 1, this 24-bit prefix value includes the $VPN_0$ value, followed by the 23-bit prefix value $P_0$, followed by a logic '1' bit.

If the prefix bitmap location $PBM_0[4]$ is activated (i.e., has a logic '1' state), then EXM engine entry 100 represents a prefix value having a 25-bit prefix length. In accordance with Table 1, this 25-bit prefix value includes the $VPN_0$ value, followed by the 23-bit prefix value $P_0$, followed by logic '01' bits. In accordance with one embodiment, more than one (and up to all 7) of the prefix bitmap locations $PBM_0[6:0]$ may be activated, thereby enabling EXM engine entry 100 to represent multiple prefix values.

FIG. 1 illustrates an example, wherein the 15-bit $VPN_0$ value is [100 0000 0000 0000], the 23-bit prefix value $P_0$ is [000 1000 1111 0000 1111 0000] and the prefix bitmap value $PBM_0$ is [011 0001]. In this example, EXM engine entry 100 effectively stores a 23-bit prefix value of [100 0000 0000 0000 000 1000 1111 0000 1111 0000], a first 25-bit prefix value of [100 0000 0000 0000 000 1000 1111 0000 1111 0000 01] and a second 25-bit prefix value of [100 0000 0000 0000 000 1000 1111 0000 1111 0000 10]. In this example, EXM engine entry 100 does not store a 24-bit prefix value.

To perform a comparison operation with EXM engine entry 100, the associated EXM engine receives a 47-bit search key value SK[46:0], which includes a 15-bit VPN value SK[46:32] and a 32-bit search key value SK[31:0]. The EXM engine masks off the bits of the search key value beyond the prefix length L. Thus, in the present example, the EXM engine 100 masks off search key bits SK[8:0], such that the search key bits SK[46:9] are provided for comparison with the EXM engine entry 100 bits $VPN_0/P_0$.

If the search key bits SK[46:32] match the $VPN_0$ value, and the search key bits SK[31:9] match the prefix value $P_0$, then the search key 'matches' the EXM entry 100, and a search hit exists. Under these conditions, the search key bits SK[31-L: 30-L] (i.e., SK[8:7]) are used to identify corresponding locations in the prefix bitmap value $PBM_0$ as indicated by Table 1. For example, if the search key bits SK[8:7] have a value of '10', then potential matches are represented by prefix bitmap locations $PBM_0[0]$ (23-bit prefix match), $PBM_0[2]$ (24-bit prefix match with the $24^{th}$ bit='1'), and $PBM_0[5]$ (25-bit prefix match with the $24^{th}$-$25^{th}$ bits='10'). Similarly, if the search key bits SK[8:7] have a value of '01', then potential matches are represented by prefix bitmap locations $PBM_0[0]$ (23-bit prefix match), $PBM_0[1]$ (24-bit prefix match with the $24^{th}$ bit='0'), and $PBM_0[4]$ (25-bit prefix match with the $24^{th}$-$25^{th}$ bits='01').

Assuming that the search key bits SK[8:7] have a value of '10', the prefix bitmap locations $PBM_0[0]$, $PBM_0[2]$ and $PBM_0[5]$ are examined to determine whether the associated prefix bitmap values are set to logic '1' values, which indicates that a hit exists. In the present example, the prefix bitmap values associated with prefix bitmap locations $PBM_0[0]$ and $PBM_0[5]$ are set to logic '1' values, indicating that a 23-bit match and a 25-bit match exist for the search key SK[46:0]. Note that the prefix bitmap location $PBM_0[2]$ is not set to a logic '1' value, thereby indicating there is no 24-bit match in the present example. The match associated with the longest prefix length (e.g., the 25-bit match in the present example) is selected as the LPM result of the associated EXM engine.

In the manner described above, a prefix bitmap value having a width of $2^n-1$ allows an EXM engine entry to cover 'n' prefix lengths. For example, a prefix bitmap value having a width of 15-bits ($2^4-1$) would allow an EXM engine entry to cover 4 prefix lengths, and a prefix bitmap value having a width of 3-bits ($2^2-1$) would allow an EXM engine entry to cover 2 prefix lengths.

Because each EXM engine entry may result in multiple matches with a search key, each EXM engine entry may need to point to multiple search results.

Figure 2:
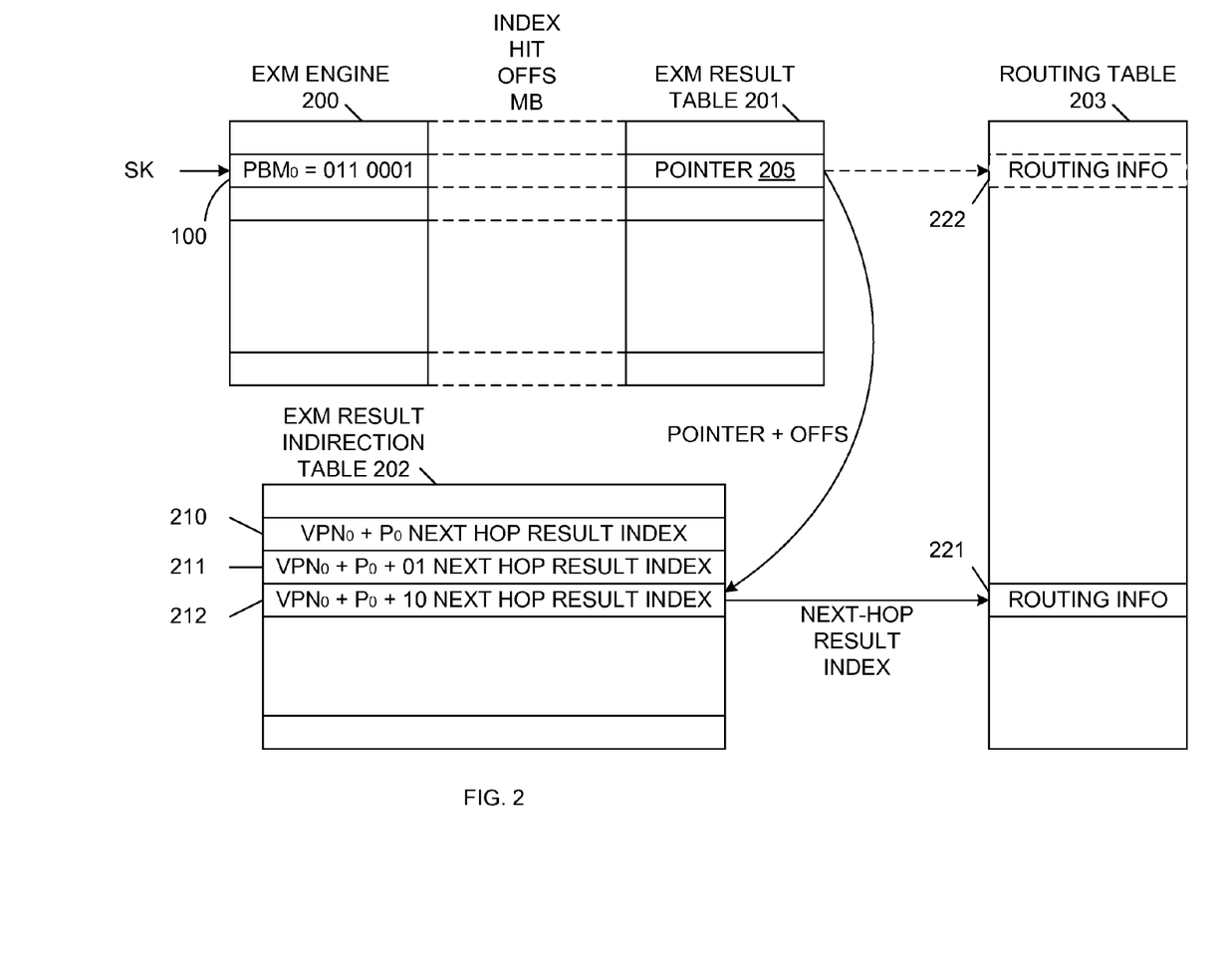
FIG. 2 is a block diagram of an EXM engine, an EXM result table, and an EXM result indirection table in accordance with one embodiment of the present invention.

FIG. 2 is a block diagram illustrating an EXM engine 200, an EXM result table 201, an EXM result indirection table 202 and a routing table 203 in accordance with one embodiment of the present invention. In the described example, EXM result table 201 has the capacity to store 2M entries, each having a width of 20-bits, and EXM result indirection table 202 has the capacity to store 2M entries, each having a width of 20-bits. EXM engine 200 stores the EXM engine entry 100 and receives the search key SK in the manner described above. As described in more detail below, in response to detecting that that the search key SK matches the EXM engine entry 100, EXM engine 200 provides an activated hit signal (HIT), and index value (INDEX), an offset value (OFFS), and a multi-bit indicator (MB). The index value INDEX indicates which entry of the EXM result table 201 is accessed in response to the detected match with the EXM engine entry 100. The multi-bit indicator MB is activated if more than one bit is set in the prefix bitmap value $PBM_0$ (and is deactivated if only one bit is set in the prefix bitmap value $PBM_0$). The offset value OFFS indicates which one of the set bits of the prefix bitmap value $PBM_0$ is associated with the longest prefix match within EXM engine entry 100.

The INDEX value is used to address EXM result table 201, such that a corresponding pointer value 205 is retrieved from EXM result table 201. In the present example, multiple (3) bits of the prefix bitmap value $PBM_0$ are set, thereby causing the multi-bit indicator MB to be activated. In the present example, EXM result indirection table 202 stores multiple (3) next-hop result index values that correspond with the multiple (3) set bits of the prefix bitmap value $PBM_0$ (i.e., $PMB_0[0]$, $PMB_0[4]$ and $PMB_0[5]$).

When the multi-bit indicator MB is activated, the offset value OFFS is added to the retrieved pointer value 205, and the resulting value is used to access EXM result indirection table 202. As described above, the offset value OFFS indicates which of the bits set in the prefix bitmap value $PBM_0$ is associated with the longest prefix match with EXM engine entry 100. For example, the offset value OFFS may have a value of '000' if $PMB_0[0]$ represents the longest prefix match, a value of '001' if $PMB_0[4]$ represents the longest prefix match, and a value of '010' if $PMB_0[5]$ represents the longest prefix match. Providing consecutive offset values in this manner advantageously allows the corresponding next-hop index values to be stored in consecutive address locations within EXM result indirection table 202.

In the present example, the search key SK results in a longest prefix match with the value represented by $PBM_0[5]$. In this case, the retrieved pointer value 205 added to the offset value OFFS points to the next-hop result index value 212 in EXM result indirection table 202. The retrieved next-hop result index value 212 is used to address routing table 203, thereby retrieving the routing information 221 associated with prefix bitmap value $PBM_0[5]$.

Note that the retrieved pointer value 205 added to the offset value OFFS would point to the next-hop result index value 210 if the longest prefix match was represented by $PBM_0[0]$. Similarly, the retrieved pointer value 205 added to the offset value OFFS would point to the next-hop result index value 211 if the longest prefix match was represented by $PBM_0[4]$.

If the prefix bitmap value $PBM_0$ only has a single bit set to a logic '1' value, the multi-bit indicator MB would be deactivated. Under these conditions, the pointer value 205 retrieved from EXM result table 201 may be used to address the routing table 203 directly (and is not used to address EXM result indirection table 202 as described above). This result is shown by dashed lines in FIG. 2, wherein the pointer value 205 is used to address routing information 222 in routing table 203.

When an entry in EXM engine 200 is to be modified, the EXM engine entry in EXM engine 200 and the corresponding entry in EXM result table 201 must be modified together atomically.

The EXM result indirection table 202 is managed in regions, wherein each region covers a number of entries that matches the number of bits set in the prefix bitmap. If a prefix bitmap value includes n set bits, and one more bit of the prefix bitmap value needs to be set, software first allocates a block of (n+1) entries in the EXM result indirection table 202, and programs this block to store corresponding next-hop result index values. The software then changes the corresponding entry of the EXM result table 201 to point to the new block in the EXM result indirection table 202. The software then frees the n-entry block in the n-entry region. To a remove a set bit from a prefix bitmap value, the opposite is performed. That is, the software allocates a block of (n−1) entries in the region, and programs this block to store corresponding next-hop result index values. The software then changes the corresponding entry of the EXM result table 201 to point to the new block in the EXM result indirection table 202. The software then frees the block. In order to implement these steps, the software maintains a list of free blocks in the EXM result indirection table. The software also supports the packing of regions within the EXM result indirection table 202. That is, the software manages EXM result indirection table 202 in regions (e.g., regions of blocks that store 2 next-hop result index values, regions of blocks that store 3 next-hop result index values, etc.) to avoid unusable fragments within the EXM result indirection table 202.

In accordance with one embodiment of the present invention, multiple EXM engines are operated in parallel to cover the desired prefixes. As described above, one EXM engine can store entries that identify LPM results for prefixes of lengths 23, 24 and 25 bits. Consider an EXM engine that is configured to have a search prefix value L=16. An EXM engine entry associated with this EXM engine will have 16 unused bits (assuming a 47-bit entry as illustrated by FIG. 1). Fifteen of these unused bits can be used to store a prefix bitmap value, which allows the EXM engine to cover four prefix lengths 16, 17, 18, and 19 ($2^4-1=15$). With longer prefix lengths (e.g., 31), there are too few unused bits in the EXM engine entry to store a meaningful prefix bitmap value. Thus, in accordance with one embodiment, dedicated prefix bitmap memories are provided to mitigate the issue without excessive area costs.

Table 2 below defines the distribution of various prefix lengths among EXM engines in accordance with one embodiment of the present invention.

TABLE 2

| Prefixes covered | Unique EXM regions | Notes |
|---|---|---|
| 0 | 0 | Range check VPN value to produce 15-bit index to read table of 32K × 20-bits to get next hop result index. Does not require EXM engine |
| 1-7 | 0 | Reserved |
| 8, 9, 10, 11 | 1 | Set L = 8; LSB 15 bits in each entry provide prefix bitmap for the 4 prefix lengths. |
| 12, 13, 14, 15 | 1 | Set L = 12; LSB 15 bits in each entry provide prefix bitmap for the 4 prefix lengths. |
| 16, 17, 18, 19 | 1 | Set L = 16; LSB 15 bits in each entry provide prefix bitmap for the 4 prefix lengths. |
| 20, 21, 22 | 1 | Set L = 20; LSB 7 bits in each entry provide prefix bitmap for the 3 prefix lengths. |
| 23, 24, 25 | 1 | Set L = 23; LSB 7 bits in each entry provide prefix bitmap for the 3 prefix lengths (See, FIG. 1). |
| 26, 27, 28, 29 | 2 | Two options: Set L = 26; Allocate one dedicated prefix bitmap memory to provide prefix bitmap for the 4 prefixes. This option should be used as long as a dedicated prefix bitmap memory is available. (In one embodiment, there are 8 available dedicated prefix bitmap memories, each having a capacity of 64K × 15-bit). In one EXM engine: Set L = 26; Use LSB 3 bits in each entry to provide prefix bitmap for the two prefix lengths of 26 and 27. In another EXM engine: Set L = 28; Use LSB 3 bits in each entry to provide prefix bitmap for the two prefix lengths 28 and 29. Note that option 2 provides worst case quantization loss. |
| 30, 31, 32 | 3 | Two options: Set L = 30; Allocate one dedicated prefix bitmap memory to provide prefix bitmap for the 3 prefixes. This option should be used as long as a dedicated prefix bitmap memory is available. (In one embodiment, there are 8 available dedicated prefix bitmap memories, each having a capacity of 64K × 15-bit). Use 3 EXM engines, one for each of the 3 prefix lengths. Note that these 3 EXM engines do not implement prefix bitmap support. Note that option 2 provides worst case quantization loss. |

Assuming the use of 32 EXM engines, each having 64K entries, the above-described scheme supports the following numbers of IPv4 LPM entries. In the worst case, 32 EXM engines are assigned to 10 unique EXM regions (10 unique leading prefixes, L). Quantization loss in this case is 9/32, and the scheme supports at least 1.51M IPv4 LPM entries (i.e., 2M*(32−9)/32). In the best case, the EXM result indirection table 202 has all 2M entries in blocks of 15. The EXM result table 201 has 2M/15 pointers and the rest are next-hop result indexes. The total number of IPv4 LPM entries is 4.05M (i.e., 2M+2M−2M/15).

The LPM search engine of the present invention can be considered a hybrid of a 'coarse' TCAM approach and single level TRIE. Unlike TCAM, the present invention uses fixed size EXM engine building blocks, which leads to quantization loss. In order to reduce this quantization loss and get reasonable worst case LPM capacity, the prefix bitmap scheme is used to allow a single EXM block to cover up to 4 prefix lengths. The prefix bitmap scheme, in a way, effectively provides a single level of TRIE structure. However, unlike regular TRIE, the single level reduces software management complexity.

As described in more detail below, the EXM engines of the present invention are implemented using hash-based approach. The complexity of software management for the scheme is mainly associated with balancing the hash-based EXM hash buckets and freeing/allocating blocks of contiguous entries for prefix bitmap values used in the EXM result indirection table 202.

In accordance with one embodiment, each EXM engine is implemented in a hash-based manner. More specifically, a prefix mask is applied to the search key to mask off bits below the selected prefix (L) of the EXM engine. The masked search key is applied to a CRC-based hash function to obtain a hash value. The hash value is used as an address to read an indirection table value, wherein the indirection table value points to one hash bucket having a plurality of EXM engine entries. The masked search key is compared with all entries of the hash bucket in parallel to determine hit/miss conditions in the manner described above in connection with FIG. 1.

Figure 3:
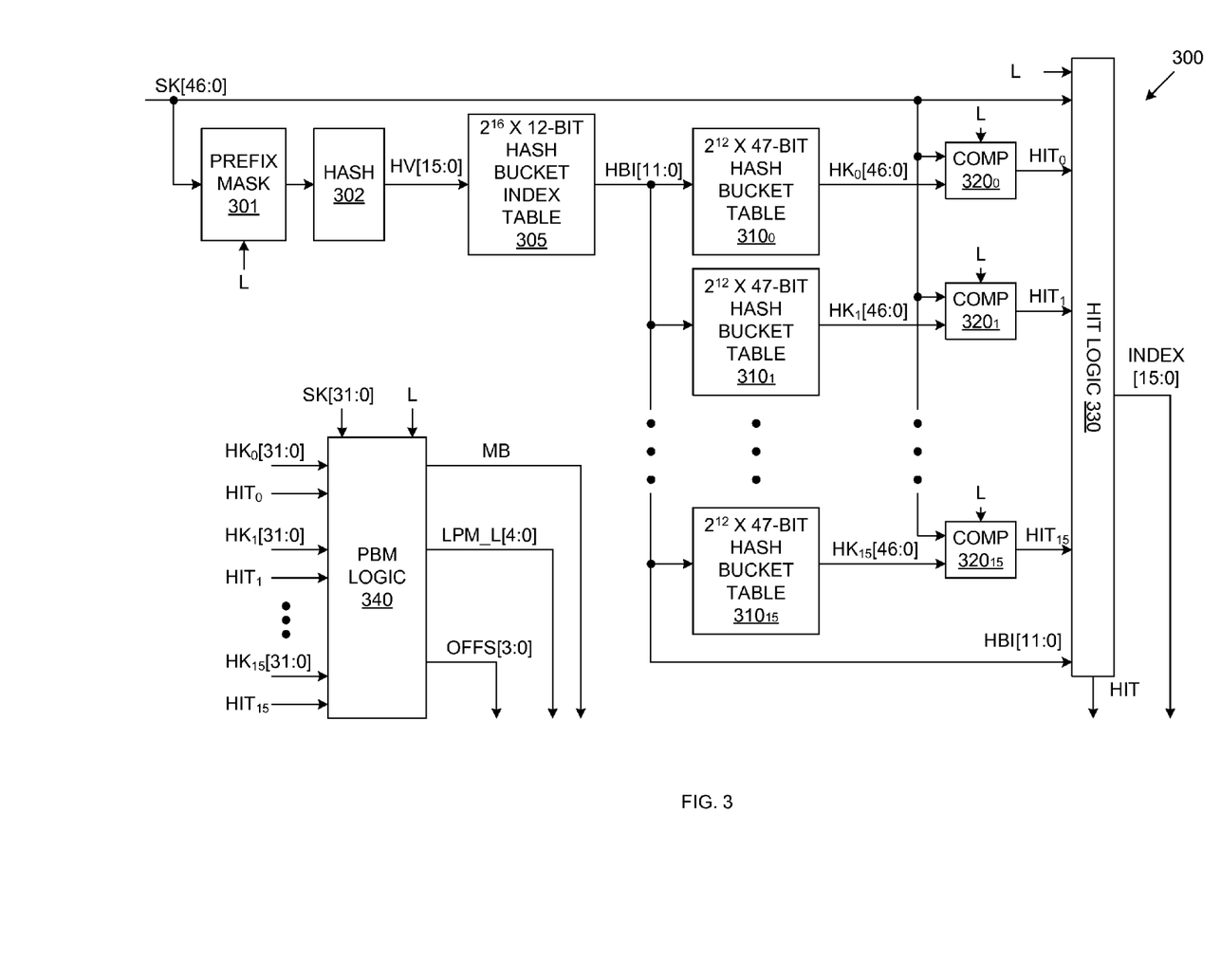
FIG. 3 is a block diagram of a hash-based EXM engine in accordance with one embodiment of the present invention.

FIG. 3 is a block diagram of a hash-based EXM engine 300 in accordance with one embodiment of the present invention. EXM engine 300 includes prefix mask 301, hash function block 302, hash bucket index table 305, hash bucket tables $310_0$-$310_{15}$, comparators $320_0$-$320_{15}$, hit logic 330 and prefix bitmap logic 340.

A 47-bit search key SK[46:0] and a 5-bit prefix length identifier L[4:0] are provided to prefix mask 301. In response, prefix mask 301 masks the bits of the search key beyond the length identified by the prefix length identifier. For example, a prefix length identifier having a value of '12' (01100) will cause prefix mask 301 to mask the 20 least significant bits of the search key (i.e., SK[19:0]).

The masked search key is routed from prefix mask 301 to hash function block 302. Hash function block 302 generates an N-bit hash value in response to the masked search key, wherein 47>N. In the described examples, hash function block 302 provides a 16-bit hash value HV[15:0] in response to the masked search key. Although N is equal to 16 in the described examples, it is understood that N can have other values in other embodiments.

Hash function block 302 generates the hash value HV[15:0] by applying a conventional hash function to the received masked search key. For example, an Ethernet CRC checksum (CRC-based hash) may be used as the hash function. Because the hash function of the described examples requires less than 32 bits of output hash value (e.g., 16-bits), only the lower bits of the Ethernet CRC checksum are used in one embodiment of the present invention. To protect against malicious attacks, various bits of the masked search key may be scrambled (e.g., swapped) prior to applying the hash function.

The hash value HV[15:0] provided by hash function block 302 is used as an address to read hash bucket index table 305. Hash bucket index table 305 is a memory array that includes $2^N$ address locations (e.g., $2^{16}$, or 64K, address locations in the described examples). Thus, hash bucket index table 305 includes an address location associated with each of the possible hash values HV[15:0]. Each address location of hash bucket index table 305 is capable of storing a Z-bit hash bucket index value, wherein Z=12 in the present example. (Note that $Z=N-\log_2(Y)$, wherein Y is equal to the number of hash bucket tables $310_0$-$310_{15}$.) Thus, hash bucket index table 305 provides an 12-bit hash bucket index value HBI[11:0] in response to the received 16-bit hash value HV[15:0]. In the described embodiments, hash bucket index table 305 is a static random access memory (SRAM), although this is not necessary.

The hash bucket index value HBI[11:0] identifies one of $2^{12}$ hash buckets, which are implemented by hash bucket tables $310_0$-$310_{15}$. Each of the $2^{12}$ hash buckets includes one entry in each of the hash bucket tables $310_0$-$310_{15}$, such that each hash bucket includes 16 entries.

Although there are sixteen hash bucket tables $310_0$-$310_{15}$ in the described examples (Y=16), it is understood that other numbers of hash bucket tables can be used in alternate embodiments. The selection of the number of hash bucket tables is an engineering decision, wherein the selected configuration should operate reliably and be feasible to implement. In general, the number of hash bucket tables is selected in view of the hash function implemented by hash function block 302. For the 47-bit to 16-bit hash function used in the described examples, a simulation with random hash keys showed a 99.99% probability of eight or fewer collisions to any particular hash value. Thus, the chance of more than 8 collisions to any particular hash value is small. Providing sixteen entries in each hash bucket allows EXM engine 300 to resolve up to sixteen collisions to any particular hash value, and provides a high probability that EXM engine 300 can reliably operate in almost all hash collision scenarios.

Providing sixteen entries in each hash bucket also provides EXM engine 300 with the flexibility to mix and match hash keys having different associated hash values within one hash bucket. As described in more detail below, if more than sixteen collisions to a particular hash value occur in EXM engine 300, system software may modify the hash function to reduce the number of collisions. Moreover, as described in more detail below, a small TCAM may be provided to resolve more than sixteen collisions to a particular hash value.

The 12-bit hash bucket index HBI[11:0] provided by hash bucket index table 305 is used as an address to simultaneously read sixteen 47-bit hash keys $HK_0$-$HK_{15}$ from hash bucket tables $310_0$-$310_{15}$, respectively. The sixteen hash keys $HK_0$-$HK_{15}$ represent the contents of a corresponding hash bucket. Each of the hash bucket tables $310_0$-$310_{15}$ has a capacity to store up to $2^Z$ (e.g., $2^{12}$) 47-bit hash keys. Each of the hash keys is encoded in the same manner described above in connection with the EXM engine entry 100 of FIG. 1. Thus, each of the hash keys includes a 15-bit VPN value, followed by a prefix value of length L, followed by a prefix bitmap value (having a length of 3, 7 or 15 bits, in accordance with Table 2.) In the described embodiments, each of the hash bucket tables $310_0$-$310_{15}$ is a dynamic random access memory (DRAM), although this is not necessary.

Comparators $320_0$-$320_{15}$ receive the sixteen 47-bit hash keys $HK_0$-$HK_{15}$ read from hash bucket tables $310_0$-$310_{15}$, respectively. Comparators $320_0$-$320_{15}$ also receive the search key value SK[46:0] and the prefix length identifier L[4:0]. Each of the comparators $320_0$-$320_{15}$ masks the bits of the search key SK[46:0] and the bits of the corresponding received hash key $HK_0$-$HK_{16}$ beyond the length identified by the prefix length identifier. For example, a prefix length identifier having a value of '12' (01100) will cause comparator $320_0$ to mask the 20 least significant bits of the search key SK (i.e., SK[19:0]) and the 20 least significant bits of the hash key $HK_0$ (i.e., $HK_0$[19:0]). Comparators $320_0$-$320_{15}$ then compare the non-masked bits of the corresponding hash keys $HK_0$-$HK_{15}$ to the non-masked bits of the search key SK. In the present example, comparators $320_0$-$320_{15}$ compare the non-masked bits $HK_0$[46:20]-$HK_{15}$[46:20] of the received hash keys $HK_0$-$HK_{15}$ to the non-masked bits SK[46:20] of the search key SK. If a match exists between the non-masked bits of the search key SK and the non-masked bits of one of the retrieved hash keys $HK_0$-$HK_{15}$, the corresponding one of comparators $320_0$-$320_{15}$ activates a hit control signal $HIT_0$-$HIT_{15}$, respectively. The hit signals $HIT_0$-$HIT_{15}$ are provided to hit logic 330. Hit logic 330 receives the hit signals $HIT_0$-$HIT_{15}$, and in response, activates a hit output signal HIT if one of the hit signals $HIT_0$-$HIT_{15}$ is activated. The entries of hash bucket tables $310_0$-$310_{15}$ are programmed in a manner that ensures that during any given cycle, at most, only one of the comparators $320_0$-$320_{15}$ provides an activated hit signal.

Hit logic 330 also receives the hash bucket index value HBI[11:0] from hash bucket index table 305. Upon receiving an activated hit control signal $HIT_X$ from comparator $320_X$, hit logic 330 activates the output hit signal HIT, and provides an output index value INDEX[15:0], wherein bits [15:4] of the output index value INDEX[15:0] are set equal to the hash bucket index HBI[11:0], and bits [3:0] of the output index signal are set equal to the 4-bit binary representation of the integer X. As a result, the output index signal INDEX[15:0] is unique to the input search key SK[46:0]. In general, the output index value INDEX[15:0] is used to access the EXM result table 201 (FIG. 2).

Prefix bitmap logic 340 receives the prefix length indicator L, the search key bits SK[31:0], the retrieved hash key bits $HK_0$[31:0]-$HK_{15}$[31:0] and the hit signals $HIT_0$-$HIT_{15}$. Prefix bitmap logic 340 retrieves the prefix bitmap value $PBM_X$ from the hash key $HK_X$[31:0] having an activated hit signal $HIT_X$, using the prefix length indicator L to identify which bits of the hash key $HK_X$ correspond with the prefix bitmap value, in the manner described above in connection with FIG. 1 and Table 2. For example, a prefix length indicator L having a value of 12 would identify a 15-bit prefix value (see, Table 2), which is located at the lowest bit positions of the hash key $HK_X$.

Prefix bitmap logic 340 also retrieves the relevant bits of the search key (beyond length L), using the prefix length indicator L to identify these relevant bits. For example, for a bit length of L=12, prefix bitmap logic 340 retrieves bits SK[19:17] of the search key (assuming that the prefix bitmap for this EXM engine covers prefix lengths 12, 13, 14 and 15 as set forth above in Table 2).

Prefix bitmap logic 340 then uses the retrieved bits SK[19:17] of the search key and the prefix bitmap value $PBM_X$ to determine the longest match represented by the hash key $HK_X$, in the manner described above in connection with FIG. 1. In response, prefix bitmap logic 340 provides a LPM length identifier LPM_L[4:0], which identifies the length of the longest match represented by the hash key $HK_X$. Note that the length of the longest match is easily derived from the prefix length indicator L and the longest match represented by the hash key $HK_X$.

Prefix bitmap logic 340 also determines whether the prefix bitmap value $PBM_X$ includes more than one set bit. Prefix bitmap logic 340 activates the multi-bit indicator MB if the retrieved prefix bitmap value $PBM_X$ has more than one bit set, and de-activates the multi-bit indicator MB if the retrieved prefix bitmap value $PBM_X$ has only one bit set. If more than one bit of the prefix bitmap value $PBM_X$ is set, then prefix bitmap logic 340 provides an offset value OFFS[3:0] that is associated with the set bit of the prefix bitmap value $PBM_X$ that corresponds with the longest prefix match. As described above in connection with FIG. 2, the value of the offset value OFFS[3:0] is selected in view of the number of set bits in the prefix bitmap value $PBM_X$, as well as the location of the particular set bit within the prefix bitmap value $PBM_X$. In general, the offset value OFFS[3:0] is added to a pointer value retrieved from the EXM result table 201 (in response to the INDEX[15:0] value) in order to access the appropriate next-hop result index from EXM result indirection table 202.

EXM engine 300 provides the HIT signal, the INDEX[15:0] value, the MB signal, the LPM_L[4:0] value and the OFFS [3:0] value as output signals. As described in more detail below, these output signals are compared with output signals of other EXM engines (in parallel) in order to identify a system-wide longest prefix match. If the output signals of EXM engine 300 represent the system-wide longest prefix match, then these output signals are used to retrieve the associated next-hop result index from the EXM result table 201/EXM result indirection table 202 in the manner described above in connection with FIG. 2. The retrieved next-hop result index is then used to retrieve the routing information associated with the received search key SK[46:0].

EXM engine 300 requires software to: (1) maintain a shadow copy of the contents of hash bucket index table 305 and hash bucket tables $310_0$-$310_{15}$, as well as the contents of the EXM result table 201 and the EXM result indirection table 202 for storage management, (2) balance hash buckets by programming hash key to hash bucket index indirection table to add new entry to the least utilized hash bucket, and (3) move hash entries away from one hash bucket to make room if a newly added entry has a hash collision, and the hash bucket to be used is full.

Hash keys may be added to EXM engine 300 in the following manner. A new search key $SK_{NEW}$[46:0] is provided to prefix mask 301, which in turn, provides a masked search value to hash function block 302 in the manner described above. In response, hash function block 302 generates a corresponding hash value $HV_A$[15:0]. System software determines whether the new search key $SK_{NEW}$ collides with any other hash key(s) previously stored in hash bucket tables $310_0$-$310_{15}$. That is, system software determines whether any search key previously stored in hash bucket tables $310_0$-$310_{15}$ causes hash function block 302 to generate the same hash value $HV_A$[15:0] as the new search key $SK_{NEW}$. If the system software determines that the new search key $SK_{NEW}$ does not collide with any other search key(s) previously stored in hash bucket tables $310_0$-$310_{15}$, then the system software may store the new search key $SK_{NEW}$ at any available location within the hash bucket tables $310_0$-$310_{15}$. For example, the system software may store the new search key $SK_{NEW}$ at address location A1 within hash bucket table $310_1$. Note that the new search key $SK_{NEW}$ is stored by storing the base prefix value (of length L), and setting the appropriate bit of the corresponding prefix bitmap value in accordance with the teachings of Tables 1 and 2. In this example, the system software also stores the address location A1 in hash bucket index table 305, at the address specified by the hash value $HV_A$[15:0]. The system software also stores a pointer value/next-hop result index associated with the new search key $SK_{NEW}$ at a location in EXM result table 201 that corresponds with an index value of [A1+0001]. If there are multiple bits set in the associated prefix bitmap value, then the EXM result indirection table 202 is also updated to store an associated next-hop result index at the appropriate offset.

When adding the new search key $SK_{NEW}$, the system software may determine that the new search key $SK_{NEW}$ collides with one or more (but less than 16) search keys previously stored in hash bucket tables $310_0$-$310_{15}$. In this case, the system software stores the new search key $SK_{NEW}$ in the same hash bucket as the colliding search key(s).

It is possible that the address location in each of the hash bucket tables $310_0$-$310_{15}$ already stores another search key (i.e., the hash bucket is full) when attempting to add the new search key $SK_{NEW}$. If at least one of these search keys (e.g., hash key $HK_{NC}$ in hash bucket table $310_X$) does not collide with the new search key $SK_{NEW}$, then the system software may move the non-colliding search key $SK_{NC}$ to another hash bucket, and then add the new search key $SK_{NEW}$ to the newly vacated location of the original hash bucket. Note that if the non-colliding search key $SN_{NC}$ collides with other search keys in the original hash bucket, these other search keys would have to be moved to the same hash bucket as the non-colliding search key $HK_{NC}$.

Figure 4:
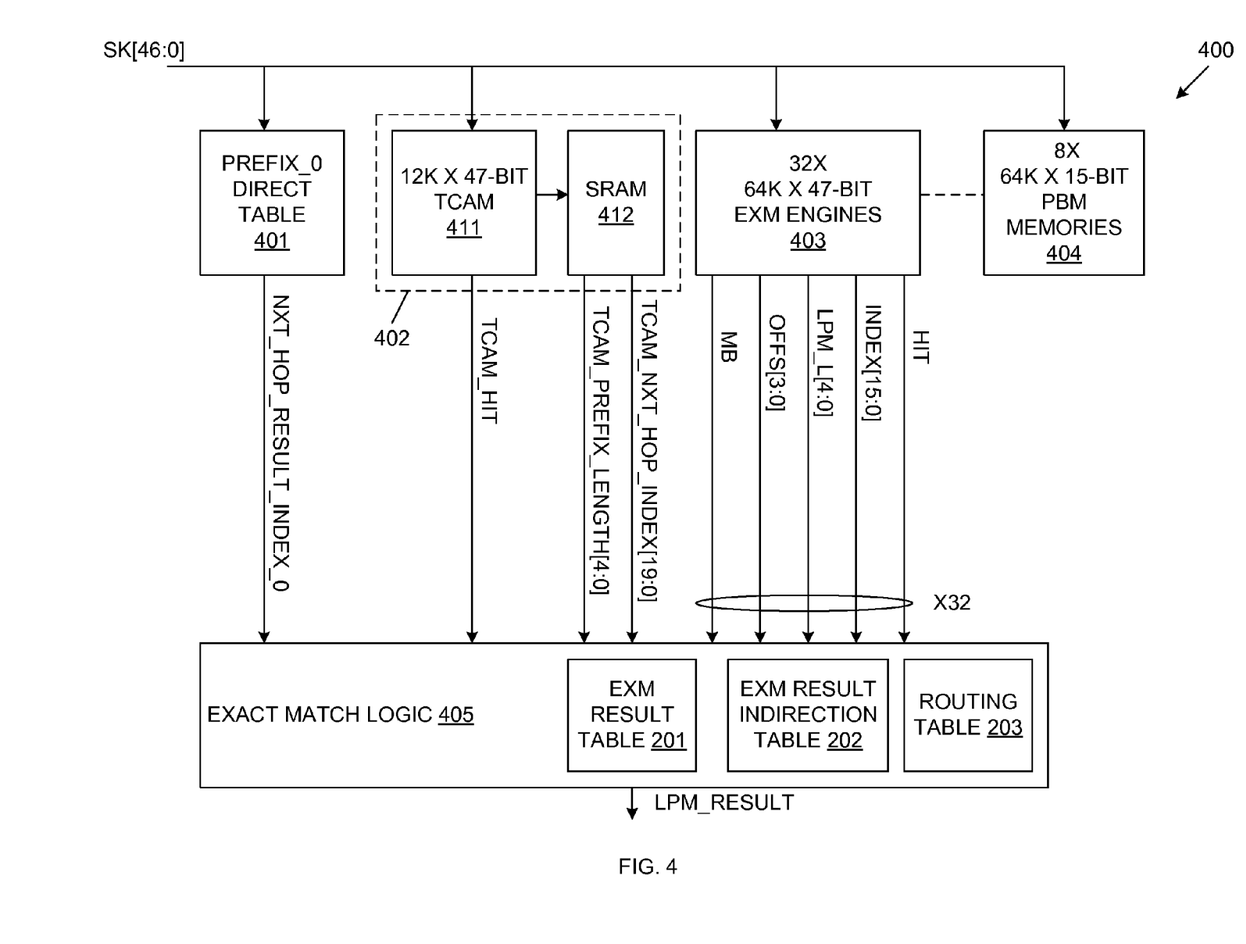
FIG. 4 is a block diagram of a longest prefix match (LPM) search engine that implements the hash-based EXM engine of FIG. 3 in accordance with one embodiment of the present invention.

FIG. 4 is a block diagram of a LPM search engine 400 in accordance with one embodiment of the present invention. LPM search engine 400 includes prefix_0 direct table 401, a relatively small TCAM system 402 (which includes a TCAM 411 having 12K entries of 47-bits each and an associated SRAM 412), thirty-two EXM engines 403 (each of which is identical to the EXM engine 300 of FIG. 3), eight prefix bitmap memories 404 (each of which includes 64K entries of 15-bits each), and exact match logic 405, which receives the results of blocks 401-404, and in response, provides an LPM result.

In general, the hardware of LPM search engine 400 is implemented as follows. Prefix_0 direct table 401 is coupled to receive the search key SK[46:0]. The 15-bit VPN value SK[46:32] of this search key is used to retrieve a corresponding next-hop result index value (NXT_HOP_RESULT_INDEX_0[19:0]) from the table 401. Note that there is no search required (i.e., there is no prefix match represented by the index value provided by table 401). The NXT_HOP_RESULT_INDEX_0 value, which represents a prefix length of 0, and has the lowest priority (lowest prefix possible) is provided to EXM match logic 405.

TCAM system 402 is provided to handle hash overflow from the EXM engines 403. TCAM system 402 can also be used to cover prefixes having a small number of entries, rather than using an entire EXM engine to store a small number of entries, which would result in quantization loss. In accordance with one embodiment, TCAM system 402 includes a TCAM 411 that is programmed in prefix length order, such that longer prefixes have a higher priority than shorter prefixes. TCAM 411 receives the search key SK[46:0], and in response, activates a hit signal TCAM_HIT when the search key SK[46:0] matches at least one entry of the TCAM 411. The highest priority match detected by TCAM 411 (i.e., the longest prefix match) is used to access a corresponding entry of SRAM 412. This entry of SRAM 412 includes a value (TCAM_PREFIX_LENGTH[4:0]) that identifies the prefix length of the corresponding entry of TCAM 411 (i.e., the length of the longest prefix match detected by TCAM 411), as well as a next-hop result index value (TCAM_NXT_HOP_INDEX[19:0]) assigned to the corresponding entry of TCAM 411 (i.e., the next-hop result index value of the longest prefix match detected by TCAM 411). The TCAM_HIT signal, the TCAM_PREFIX_LENGTH[4:0] value and the TCAM_NXT_HOP_INDEX[19:0] value are provided to exact match logic 405.

Each of the thirty-two EXM engines 403 is software programmed to implement a base prefix length L, in the manner described above in connection with FIG. 3. As described above, each of the EXM engines 403 provides a hit signal HIT, which is activated when the search key SK[46:0] matches an entry of the EXM engine; a multi-bit indicator MB that indicates whether the prefix bitmap value associated with the matching entry of the EXM engine includes more than one set bit; an LPM_L[4:0] value that indicates the length of a longest prefix match detected by the EXM engine; an INDEX[15:0] value that identifies an address of a pointer value within EXM result table 201; and an offset value OFFS [3:0] that (along with the pointer value) identifies an address of a next-hop result index value within EXM result indirection table 202. Note that EXM result table 201, EXM result indirection table 202 and routing table 203 are included in exact match logic 405.

Each of the eight prefix bitmap memories 404 may be assigned to corresponding ones of the thirty-two EXM engines 403, in order to store the prefix bitmap values for the corresponding EXM engine. This assignment may be made if the corresponding EXM engine has a long prefix (e.g., P=26 to 32), and therefore does not have sufficient spare bits to store a longer prefix bitmap value (e.g., a prefix bitmap value of 7-bits or 15-bits).

Prefix_0 direct table 401, TCAM system 402 and EXM engines 403 are searched in parallel with a fixed latency. The results are combined within exact match logic 405, and the routing information associated with the longest matching prefix is provided as LPM_RESULT. More specifically, TCAM system 402 produces up to one next hop result index and 5-bit prefix length value, and EXM engines 403 produce up to 32 next hop result indexes and corresponding 5-bit prefix length values. Out of the hits detected by TCAM system 402 and EXM engines 403, the hit associated with the longest prefix length wins. That is, exact match logic 405 compares the TCAM_PREFIX_LENGTH[4:0] value provided by TCAM system 402 with the LPM_L[4:0] values provided by the EXM engines 403, and in response, identifies the value that represents the longest prefix match.

If the TCAM_PREFIX_LENGTH[4:0] value provided by TCAM system 402 represents the longest prefix match, then the TCAM_NXT_HOP_INDEX[19:0] value provided by TCAM system 402 is used to access the routing memory 203 (within exact match logic 405), thereby retrieving the associated routing information from the routing memory 203. This retrieved routing information is provided by exact match logic 405 as the LPM_RESULT.

If the LPM_L[4:0] value provided by one of the EXM engines 403 represents the longest prefix match, then the INDEX[15:0] value, the OFFS[3:0] value and the MB signal of this EXM engine are used to access the EXM result table 201, the EXM indirection table 202 and the routing table 203, in the manner described above in connection with FIG. 2, thereby retrieving the associated routing information from the routing memory 203. This retrieved routing information is provided by exact match logic 405 as the LPM_RESULT.

If neither TCAM 402 system nor EXM engines 403 detect a hit, then the NXT_HOP_RESULT_INDEX_0[19:0] value provided by prefix_0 direct table 401 is used to access the routing memory 203, thereby retrieving the associated routing information from the routing memory 203. This retrieved routing information is provided by exact match logic 405 as the LPM_RESULT. In this manner, exact match logic 405 provides routing information associated with the longest prefix match detected by LPM search engine 400.

Second Embodiment

In accordance with another embodiment, a plurality of EXM engines, each capable of serving one or multiple prefixes of different lengths, are used to implement either IPv4 or IPv6 LPM searches. As described above, the IPv4 search key includes a 15-bit L3 VPN value (which requires an exact match) and a 32-bit IPv4 address (which requires prefix matches from /1 to /32), for a total search key length of 47-bits. In accordance with the second embodiment, an IPv6 search key includes a 15-bit L3 VPN value (which requires an exact match) and a 128-bit IPv6 address (which requires prefix matches from /1 to /128), for a total search key length of 143-bits.

In general, a single EXM engine may be used to serve IPv4 prefixes or short IPv6 prefixes, while multiple EXM engines are combined to service longer IPv6 prefixes. Again, the LPM searches with each of the EXM engines are completed in parallel with a single stride (comparison), thereby providing a fixed low latency for the LPM scheme.

Figure 5:
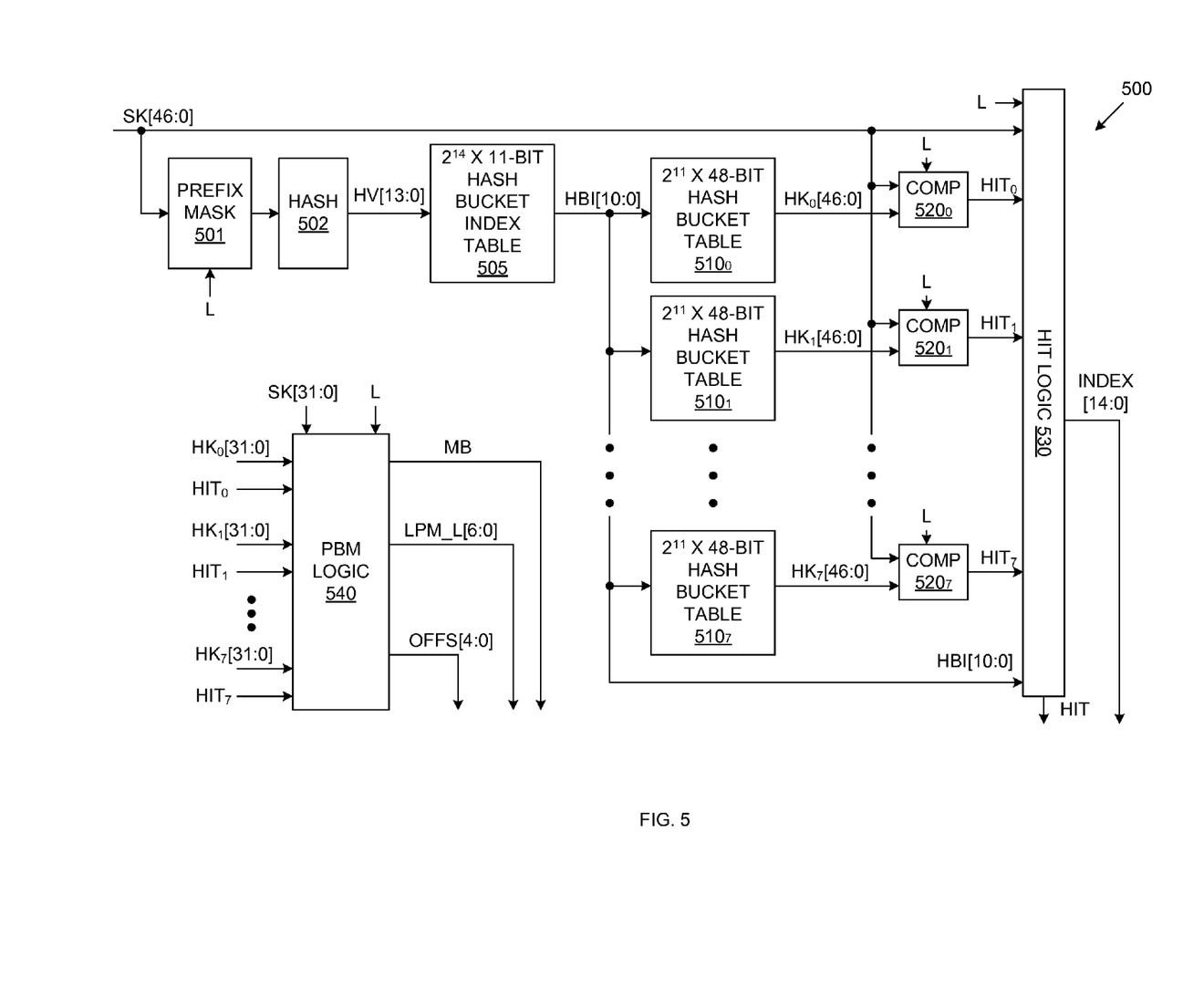
FIG. 5 is a block diagram of a hash-based EXM engine in accordance with an alternate embodiment of the present invention.

FIG. 5 is a block diagram of an EXM engine 500 in accordance with the second embodiment. EXM engine 500 includes prefix mask block 501, hash function block 502, hash bucket index table 505, hash bucket tables $510_0$-$510_7$, comparators $520_0$-$520_7$, hit logic 530 and prefix bitmap logic 540.

Prefix mask block 501 and hash function block 502 are similar to prefix mask block 301 and hash function block 302, which have been described above in connection with FIG. 3. Thus, EXM engine 500 receives a 47-bit search key SK[46:0], which is provided to prefix mask block 501. Prefix mask block 501 masks the search key bits beyond the base prefix length L, and the masked search key is provided to hash function block 502. In the described embodiment, hash function block 502 provides the 14 least significant bits of a CRC-32 hash function as a 14-bit hash value HV[13:0]. This hash function provides good 'confusion' characteristics and is much lower cost to implement compared to other hash functions. Hash function block 502 provides the 14-bit hash value to hash bucket index table 505. Hash bucket index table 505 includes 16K×11-bit entries, and implements hash value to hash bucket indirection. In accordance with one embodiment, hash bucket index table 505 is a 2K×88-bit physical memory, which implements the logical 16K×11-bit memory.

Hash bucket index table 505 provides an 11-bit hash bucket index value HBI[10:0] to hash bucket tables $510_0$-$510_7$. Each of the eight hash bucket tables $510_0$-$510_7$ includes 2K entries of 47-bits. In accordance with one embodiment, the eight 2K×48-bit hash bucket tables $510_0$-$510_7$ are implemented by a 2K×376-bit physical memory. 1. Note that EXM engine 500 includes only 8 hash bucket tables (vs. 16 hash bucket tables in EXM engine 300). Although the larger hash bucket size is capable of resolving more hash collisions, the larger hash bucket size is also more expensive to implement (due to more memory read/write flops, and the lower area efficiency of wider memories). Also note hash bucket tables $510_0$-$510_7$ provide 16K entries (vs. 64K entries in hash bucket tables $310_0$-$310_{15}$). This smaller number of entries advantageously reduces quantization loss.

Hash bucket index table 505 is key to gaining close to 100% efficiency, because this table 505 allows software to mix and match different sets of search keys with the same hash value. As long as there are no more than 8 collisions to the same hash value, EXM engine 500 can support 16K entries to 100%. Assuming a Poisson distribution of the hash values provided by hash function 502, the probability of 8 collisions to the same hash value is less than 0.001%. Although software management of the hash bucket index table 505 and hash bucket entries is required, this software management is not complicated.

In general, hash bucket tables $510_0$-$510_7$ store hash key values in the manner described above in connection with FIG. 1. That is, hash bucket tables $510_0$-$510_7$ store hash key values having a prefix value of length L and an associated prefix bitmap value. Hash bucket tables $510_0$-$510_7$ are addressed by the hash bucket index value HBI[10:0], and in response, provide hash key values $HK_0$[46:0]-$HK_7$[46:0] to comparators $520_0$-$520_7$, respectively. Comparators $520_0$-$520_7$ operate in the same manner as comparators $320_0$-$320_{15}$ (FIG. 3) to generate hit signals $HIT_0$-$HIT_7$, respectively. Hit logic 530 operates in the same manner as hit logic 330 (FIG. 3) to generate the hit signal HIT and the index signal INDEX[14:0].

Prefix bitmap logic 540 receives the prefix length indicator L, the search key bits SK[31:0], the retrieved hash key bits $HK_0$[31:0]-$HK_7$[31:0] and the hit signals $HIT_0$-$HIT_7$. Prefix bitmap logic 540 operates in the same manner as prefix bitmap logic 340 (FIG. 3) to generate the multi-bit identifier MB, the longest prefix match length value LPM_L[6:0] and the offset value OFFS[4:0]. In the present embodiment, the LPM_L value has a width of 7 bits to identify prefix match lengths up to 128 bits. In addition, the offset value OFFS includes 5 bits to identify up to 32 offset values, which are possible when using a prefix bitmap value having a width of up to 32-bits. EXM engine 500 provides the HIT signal, the INDEX[14:0] value, the MB signal, the LPM_L[6:0] value and the OFFS[4:0] value as output signals. As described in more detail below, these output signals are compared with output signals of other EXM engines in order to identify a longest prefix match. If the output signals of EXM engine 500 represent the longest prefix match, then these output signals are used to retrieve the associated next-hop result index from the EXM result table 201/EXM result indirection table 202 in the manner described above in connection with FIG. 2. The retrieved next-hop result index is then used to retrieve the routing information from the routing table 203.

Figure 6:
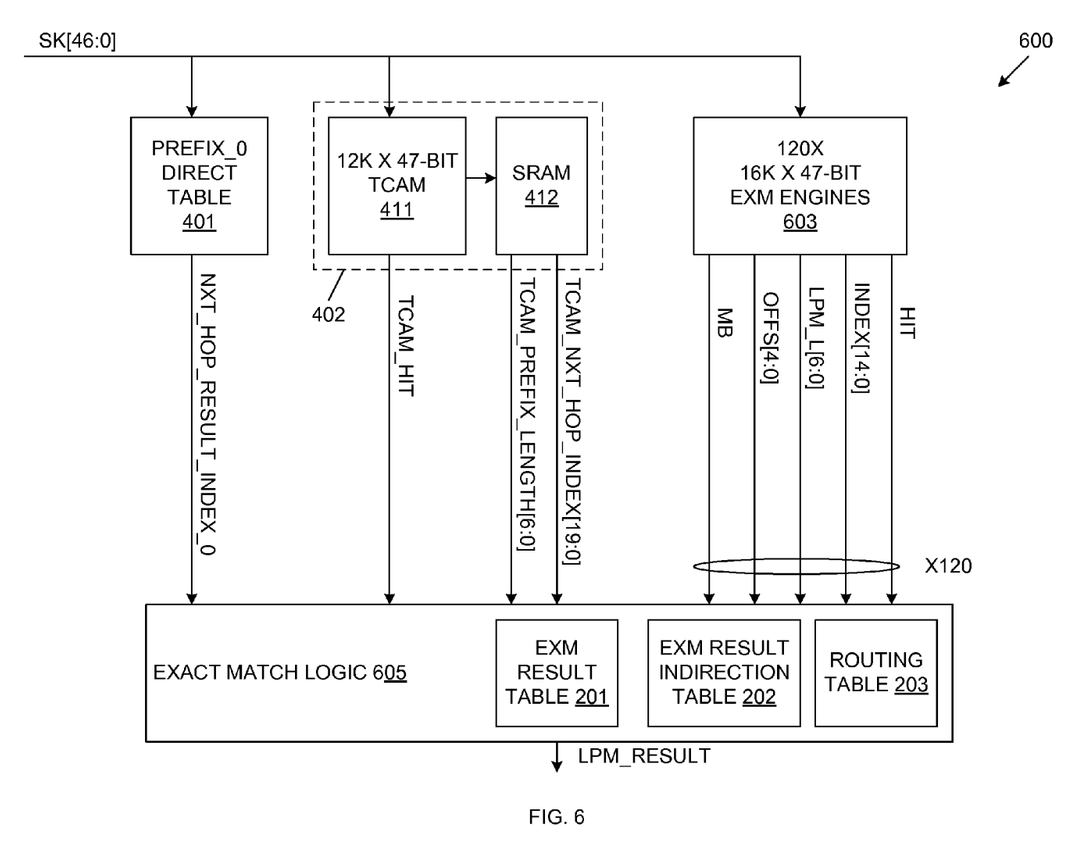
FIG. 6 is a block diagram of a longest prefix match (LPM) search engine that implements the hash-based EXM engine of FIG. 5 in accordance with one embodiment of the present invention.

FIG. 6 is a block diagram of a LPM search engine 600 in accordance with one embodiment of the present invention. Because LPM search engine 600 is similar to LPM search engine 400, similar elements in FIGS. 4 and 6 are labeled with similar reference numbers. Thus, LPM search engine 600 includes prefix_0 direct table 401 and TCAM system 402. LPM search engine 600 also includes 120 EXM engines 603 (each of which is identical to the EXM engine 500 of FIG. 5), and exact match logic 605, which receives the results of blocks 401, 402 and 603, and in response, provides an LPM_RESULT value in the same manner as exact match logic 405 (FIG. 4).

Note that LPM search engine 600 has substantially more EXM engines than LPM search engine 400 (120 vs. 32). Each of the EXM engines 603 can be programmed to cover certain prefix lengths in the manner described above. In addition, multiple EXM engines can be combined to support longer prefix lengths (e.g., IPv6 prefixes).

In accordance with one embodiment, the present invention provides default virtual routing and formatting (VRF) support. With default VRF support, a search is performed using the VPN value of an incoming frame, and a parallel search is performed, replacing the VPN value of the incoming frame with a default VPN value. The two results are combined, favoring the result obtained from searching with the actual VPN value of the incoming frame. In this example, extra EXM engines are programmed to search the default VPN value.

The prefix bitmap is implemented in IPv4-based search keys in the manner described above in connection with the first embodiment. As described above (Table 2), the 120 EXM engines are used to implement ten unique EXM regions (L=8, 12, 16, 20, 23, 26, 28, 30, 31 and 32). Without default VRF support, there is a worst case quantization loss of 9 EXM engines (out of 120 EXM engines). As a result, the LPM search engine 600 has a worst case support of (120−9)*16*1024=1,818,624 IPv4 routes. If default VRF support is provided, there is a worst case quantization loss of 2*9 EXM engines. As a result, the LPM search engine 600 has a worst case support of (120−18)*16*1024=1,671,168 IPv4 routes.

Difficulties in supporting IPv6 LPM exist because the prefix lengths vary from 1 to 128. Typical IPv6 LPM operations implement prefix lengths /1 to /64, /127 and /128. Note that prefix lengths /65 to /126 are typically not used in IPv6 Internet core. Although prefixes in this range are allowed and can be used in private VPNs, these prefixes are not used in a typical deployment. The additional prefix lengths associated with IPv6 LPM operations undesirably lead to higher quantization loss. In accordance with the second embodiment of the present invention, multiple EXM engines are combined to support long prefix lengths. Note that the number of EXM engines required to support a prefix length of /128 contributes to worst case scalability. In the present embodiment, the worst case IPv6 scalability may be defined as follows: S=16K*(128−QL)/N, where QL is the quantization loss or number of unique EXM regions R minus 1, and N is the number of EXM engines required to support a prefix length of /128.

The EXM engines that are combined to support a longer prefix length need to provide: (1) a single 16K×11-bit hash bucket index memory, and (2) a single 16K×(L+15+15)-bit hash bucket memory, wherein L is the prefix size, which is less than or equal to 128.

Two EXM engines provide two 16K×11-bit hash bucket index memories, wherein one of these hash bucket index memories is available to store either search key values or prefix bitmap values. Two EXM engines also provide two 16K entry hash bucket memories, each having a width of 47-bits. These two hash bucket memories provide a total of 94 bits (i.e., 2×47-bits), which can be used to store either search key values or prefix bitmap values. Two EXM engines combined therefore provide 105 bits for hash bucket search key or prefix bitmap storage.

Three EXM engines provide three 16K-entry hash bucket index memories, each having an 11-bit width. In this case, two 16K×11-bit hash bucket index memories are available to store search key values or prefix bitmap values. Three EXM engines also provide three 16K entry hash bucket memories, each having a width of 47-bits. These hash bucket memories provide a total of 141 bits (i.e., 3×47-bits), which can be used to store either search key values or prefix bitmap values. Three EXM engines combined therefore provide 163 bits for hash bucket search key or prefix bitmap storage e.

In order to combine multiple EXM engines to support longer prefixes, the following pipeline changes are implemented. One EXM engine is selected to be a master, while the remaining combined EXM engine(s) are slaves that follow the master. During a search operation, a hash bucket index value is read from the hash bucket index memory of the master EXM engine. This hash bucket index value is used to access the hash bucket memory in the master EXM engine, as well as the hash bucket memory in each of the slave EXM engines. The hash bucket index value can also be used to access the hash bucket index memory in each of the slave EXM engines, if necessary. The search key is compared with the entries retrieved from the hash bucket memories (master and slave) and the hash bucket index memories (slave) (if necessary). Note that the search key is compared to eight retrieved hash bucket entries in parallel. As described above, software programming ensures there is, at most, one hit in the 8 parallel comparison operations.

The bits retrieved from the hash index memory and hash bucket memory that are not used in the comparison operation are latched. These latched bits include the prefix bitmap values associated with the retrieved hash values. The prefix bitmap value associated with a hash value that resulted in a 'hit' is used to identify the longest prefix match in the manner described above.

Table 3 below illustrates IPv6 prefix coverage with a single EXM engine.

TABLE 3

| # of EXM instances | Prefix lengths covered | Prefix bitmap width | VPN width + base prefix length + prefix bitmap width |
| --- | --- | --- | --- |
| 1 | 1-5 | 31 | 15 + 1 + 31 = 47 |
| 1 | 6-9 | 15 | 15 + 6 + 15 = 36 |
| 1 | 10-13 | 15 | 15 + 10 + 15 = 40 |
| 1 | 14-17 | 15 | 15 + 14 + 15 = 44 |
| 1 | 18-20 | 7 | 15 + 18 + 7 = 40 |
| 1 | 21-23 | 7 | 15 + 21 + 7 = 43 |
| 1 | 24-26 | 7 | 15 + 24 + 7 = 46 |

Table 4 below illustrates IPv6 prefix coverage with two EXM engines.

TABLE 4

| # of EXM instances | Prefix lengths covered | Prefix bitmap width | VPN width + base prefix length + prefix bitmap width |
| --- | --- | --- | --- |
| 2 | 27-31 | 31 | 15 + 27 + 31 = 73 |
| 2 | 32-36 | 31 | 15 + 32 + 31 = 78 |
| 2 | 37-41 | 31 | 15 + 37 + 31 = 83 |
| 2 | 42-46 | 31 | 15 + 42 + 31 = 88 |
| 2 | 47-51 | 31 | 15 + 47 + 31 = 93 |
| 2 | 52-56 | 31 | 15 + 52 + 31 = 98 |
| 2 | 57-61 | 31 | 15 + 57 + 31 = 103 |
| 2 | 62-65 | 15 | 15 + 62 + 15 = 92 |
| 2 | 66-70 | 15 | 15 + 66 + 15 = 96 |
| 2 | 71-74 | 15 | 15 + 71 + 15 = 101 |
| 2 | 75-78 | 15 | 15 + 75 + 15 = 105 |

Table 5 below illustrates IPv6 prefix coverage with three EXM engines.

TABLE 5

| # of EXM instances | Prefix lengths covered | Prefix bitmap width | VPN ID width + base prefix length + prefix bitmap width |
| --- | --- | --- | --- |
| 3 | 79-83 | 31 | 15 + 79 + 31 = 125 |
| 3 | 84-88 | 31 | 15 + 84 + 31 = 130 |
| 3 | 89-93 | 31 | 15 + 89 + 31 = 135 |
| 3 | 94-98 | 31 | 15 + 94 + 31 = 140 |
| 3 | 99-103 | 31 | 15 + 99 + 31 = 145 |
| 3 | 104-108 | 31 | 15 + 104 + 31 = 150 |
| 3 | 109-113 | 31 | 15 + 109 + 31 = 155 |
| 3 | 114-118 | 31 | 15 + 114 + 31 = 160 |

TABLE 5-continued

| # of EXM instances | Prefix lengths covered | Prefix bitmap width | VPN ID width + base prefix length + prefix bitmap width |
| --- | --- | --- | --- |
| 2 | 119-122 | 15 | 15 + 119 + 15 = 149 |
| 3 | 123-124 | 3 | 15 + 123 + 3 = 141 |
| 3 | 125-128 | 15 | 15 + 125 + 15 = 155 |

In accordance with Tables 3, 4 and 5, 62 (7+22+33) unique EXM instances are required to cover all prefix lengths from /1 to /128. The worst case scalability, without VRF support, in this example is therefore 311,296 IPv6 routes (i.e., (120−61)/3×16×1024). Providing default VRF support for prefix lengths of /1 to /64 and /125 to /128 introduces an additional 25 EXM engines of quantization loss (i.e., 7+16+3−1). The worst case scalability with VRF support in this example is therefore 185,685 IPv6 routes (i.e., (120−61−25)/3×16×1024).

As described above, there is typically no need to support prefix lengths of /65 to /126. In this case, the worst case scalability, without providing default VRF support is 518,826 IPv6 routes (i.e., (120−25)/3×16×1024). Providing default VRF support in this case introduces an additional 25 EXM engines of quantization loss, thereby providing worst case scalability of 382,293 IPv6 routes (i.e., (120−25−25)/3×16×1024).

As described above, the present example implements 120 EXM engines. In this example, the EXM result table 201 can be implemented by 120×16K×21-bit memories, and the EXM result indirection table 202 can be implemented by a 1.5M×20-bit memory.

In accordance with one embodiment, the 12K×47-bit TCAM in TCAM system 402 is implemented by three 4K×47-bit TCAMs. These three TCAMs can be used to serve as a 12K entry TCAM for IPv4 47-bit search keys, or to serve as a 4K entry TCAM for IPv6 143-bit search keys.

The following design considerations are taken into account in the second embodiment. In the present example, three EXM engines form one building block, and there are three modes per three-EXM engine building block. In a first mode, the three EXM engines of a building block operate independently (x1) to cover IPv4 or short IPv6 prefixes (see, e.g., Tables 2 and 3). In a second mode, one of the three EXM engines of a building block cover IPv4 or short IPv6 prefixes, and two of the three EXM engines of the building block cover medium length IPv6 prefixes (see, e.g., Table 4). In a third mode, all three EXM engines of the building block cover longer IPv6 prefixes (see, e.g., Table 5). In accordance with one embodiment, two three-EXM engine building blocks share one slave interface, such that there are 20 sub-blocks (slave interfaces) within the LPM search engine 600. The hierarchical slave interfaces advantageously reduce the required wiring within the LPM search engine.

In the described embodiment, each EXM engine requires 120 flops, for the hash function to implement CRC-32, to store the delayed hash key for hash bucket comparison, to store hash bucket index and bucket memory read data, and for prefix bitmap processing. In addition, each software slave interface requires 30 flops. The total flop count for LPM search engine 600 is about 150K to 200K, for a total gate count of about 3M to 4M. As a result, it is possible to implement LPM search engine 600 of the second embodiment on a single integrated circuit chip.

In accordance with one variation of the present invention, it is possible to operate an EXM engine (e.g., EXM engine 300 or EXM engine 500), such that the prefix bitmap value only defines entries of a single prefix length. For example, EXM engine 300 (or 500) can be used to store entries having only 27-bit prefix lengths as follows. A base prefix value ($P_X[31:8]$) having a length of L=24 bits is selected, and a prefix bitmap value ($PBM_X[7:0]$) having a length of 8-bits is selected. In this embodiment, each EXM entry can store up to eight 27-bit prefix values. Each 27-bit long prefix value is encoded as set forth below in Table 6.

TABLE 6

Prefix Bitmap

| Prefix Bitmap Location | Associated Prefix length | Prefix Hit if Prefix Bitmap bit is Set |
|---|---|---|
| $PBM_X[0]$ | 24-bits (L) | $VPN_X + P_X + 000$ |
| $PBM_X[1]$ | 24-bits (L) | $VPN_X + P_X + 001$ |
| $PBM_X[2]$ | 24-bits (L) | $VPN_X + P_X + 010$ |
| $PBM_X[3]$ | 24-bits (L) | $VPN_X + P_X + 011$ |
| $PBM_X[4]$ | 24-bits (L) | $VPN_X + P_X + 100$ |
| $PBM_X[5]$ | 24-bits (L) | $VPN_X + P_X + 101$ |
| $PBM_X[6]$ | 24-bits (L) | $VPN_X + P_X + 110$ |
| $PBM_X[7]$ | 24-bits (L) | $VPN_X + P_X + 111$ |

The EXM engine operates in the same manner described above in connection with FIGS. 3 and 5, with the following exception. When a hit is detected, prefix bitmap logic 340/540 always reports a longest prefix match length of 27-bits (e.g., LPM_L[4:0]='11011').

Although the present example uses an 8-bit prefix bitmap value, it is understood that prefix bitmap values having other widths can be used. For example, EXM engine 300 (or 500) can be used to store entries having only 30-bit prefix lengths by using a base prefix value ($P_X[31:4]$) having a length L of 28 bits, and a prefix bitmap value ($PBM_X[3:0]$) having a length of 4-bits. In this embodiment, each EXM entry can store up to four 30-bit prefix values.

Moreover, although the present example describes an EXM engine that stores only 27-bit (or 30-bit) prefix values, it is understood that an EXM engine can be used to store prefix values of various lengths. For example, an EXM engine could store only 24-bit prefix values in another embodiment. In a particular embodiment, the present example can be used to store prefix values having lengths that are numerous and common.

Note that the method of using the prefix bitmap value to define only entries of a single prefix length can be combined with the first and second embodiments described above, wherein certain EXM engines store prefix bitmap values that define a single prefix length, while other EXM engines store prefix bitmap values that define multiple prefix lengths.

Although the present invention has been described in connection with various embodiments, it is understood that variations of these embodiments would be obvious to one of ordinary skill in the art. Thus, the present invention is limited only by the following claims.

We claim:

1. A search engine that implements longest prefix match (LPM) comprising:
    an entry that represents a plurality of prefix values having different lengths, the entry including a prefix value having a base prefix length L, and a prefix bitmap value that identifies matching prefix values having prefix lengths of L and L+1.

2. The search engine of claim 1, wherein the prefix bitmap value identifies matching prefix values having a prefix length of L+2.

3. The search engine of claim 2, wherein the prefix bitmap value identifies matching prefix values having a prefix length of L+3.

4. The search engine of claim 1, wherein the prefix bitmap value identifies matching prefix values having n different prefix lengths, wherein the prefix bitmap value has a width of $2^n - 1$ bits.

5. The search engine of claim 1, wherein the entry further comprises a virtual private network (VPN) value that identifies a virtual private network associated with the prefix value.

6. The search engine of claim 1, further comprising a result table having a result entry associated with the entry, wherein the result entry stores a next-hop result index if the prefix bitmap value includes one and only one activated bit.

7. The search engine of claim 6, further comprising a result indirection table having a plurality of result indirection entries associated with the result entry if the prefix bitmap value includes more than one activated bit, wherein each of the result indirection entries stores a corresponding next-hop result index.

8. The search engine of claim 1, wherein the prefix bitmap value includes:
    a first bit that indicates whether the prefix value represents an L bit matching value;
    a second bit that indicates whether the prefix value concatenated with a logic '0' bit represents an L+1 bit matching value; and
    a third bit that indicates whether the prefix value concatenated with a logic '1' bit represents an L+1 bit matching value.

9. A method of implementing a longest prefix match (LPM) operation comprising:
    comparing an L-bit portion of a search key with an L-bit prefix value to determine whether a match exists; and
    if a match exists, then using a prefix bitmap value associated with the L-bit prefix value to determine a longest prefix match associated with the existing match, wherein the prefix bitmap value is encoded to identify one or more matching prefix values having lengths of L and L+1 bits.

10. The method of claim 9, wherein the prefix bitmap value is further encoded to identify one or more matching prefix values having a length of L+2 bits.

11. The method of claim 9, further comprising retrieving a next-hop result index associated with the longest prefix match from a corresponding entry of a result table if the prefix bitmap value identifies one and only one matching prefix value.

12. The method of claim 11, further comprising using the corresponding entry of the result table to point to one of a plurality of entries of a result indirection table if the prefix bitmap value identifies more than one matching prefix value.

13. The method of claim 12, further comprising retrieving a next-hop result index associated with the longest prefix match from one of the plurality of entries of the result indirection table.

14. The method of claim 9, wherein the prefix bitmap value is encoded by:
    selecting a first bit of the prefix bitmap value to indicate whether the existing match represents an exact match with the L-bit portion of the search key;
    selecting a second bit of the prefix bitmap value to indicate whether the existing match represents an exact match with the L-bit portion of the search key concatenated with a logic '0' bit; and selecting a third bit of the prefix bitmap value to indicate whether the existing match represents an exact match with the L-bit portion of the search key concatenated with a logic '1' bit.

15. A method of implementing a longest prefix match (LPM) operation comprising:
  comparing an L-bit portion of a search key with an L-bit prefix value to determine whether a match exists; and
  if a match exists, then using an n-bit portion of the search key, separate from the L-bit portion, to reference a $2^n-1$ bit prefix bitmap value to determine a longest prefix match associated with the existing match, wherein the prefix bitmap value is encoded to identify matching prefix values having lengths from L to L+n bits.

16. The method of claim 15, wherein the n-bit portion is consecutive with the L-bit portion within the search key.

17. The method of claim 15, further comprising retrieving a next-hop result index associated with the longest prefix match from a corresponding entry of a result table if the prefix bitmap value identifies one and only one matching prefix value.

18. The method of claim 17, further comprising using the corresponding entry of the result table to point to one of a plurality of entries of a result indirection table if the prefix bitmap value identifies more than one matching prefix value.

19. The method of claim 18, further comprising retrieving a next-hop result index associated with the longest prefix match from one of the plurality of entries of the result indirection table.

20. A method of implementing a longest prefix match (LPM) operation comprising:
  performing exact match operations in a plurality of RAM-based exact match engines in parallel, wherein each of the RAM-based exact match engines provides an exact match result with the same fixed search latency, and wherein each of the RAM-based exact match engines provides an exact match result that covers a plurality of prefix lengths; and
  selecting a longest prefix match result from the exact match results provided by the RAM-based exact match engines.

21. The method of claim 20, further comprising combining exact match results from a plurality of the RAM-based exact match engines to provide an exact match result for a prefix length longer than a longest prefix length supported by a single one of the RAM-based exact match engines.

22. The method of claim 20, further comprising performing exact match operations in a ternary content addressable memory (TCAM) in parallel with the exact match operations performed in the plurality of RAM-based exact match engines.

23. A search engine that implements a prefix match comprising:
  an entry that represents a plurality of prefix values having one and only one length, the entry including a prefix value having a base prefix length L, and a prefix bitmap value that identifies multiple matching prefix values having a prefix length greater than L.

24. The search engine of claim 23, wherein the prefix bitmap value has a length M, and the prefix length is equal to $L+\log_2 M$.

25. A method of implementing a prefix match operation comprising:
  comparing an L-bit portion of a search key with an L-bit prefix value to determine whether an L-bit match exists; and
  if an L-bit match exists, then accessing a bit of an M-bit prefix bitmap value associated with the L-bit prefix value in response to a $\log_2 M$-bit portion of the search key, wherein each bit of the M-bit prefix bitmap value is encoded to identify a matching prefix value having a length of $L+\log_2 M$ bits.

\* \* \* \* \*